United States Patent [19]
Dohard et al.

[11] Patent Number: 6,127,455
[45] Date of Patent: Oct. 3, 2000

[54] PROCESS FOR FORMING A SEED POLYMER

[75] Inventors: Michael J. Dohard, Boardman; John W. Guyer, Akron; Vincent M. Rasicci, Uniontown, all of Ohio

[73] Assignee: OMNOVA Solutions Inc., Fairlawn, Ohio

[21] Appl. No.: 08/837,142

[22] Filed: Apr. 14, 1997

[51] Int. Cl.$^7$ .............................. C08L 9/00; C08L 9/08; C08L 33/06

[52] U.S. Cl. ..................... 523/201; 523/200; 523/205; 524/504; 524/822; 524/832; 524/834

[58] Field of Search .................................... 523/201, 200, 523/205; 526/213, 216; 524/832, 834, 822, 504

[56] References Cited

U.S. PATENT DOCUMENTS

| | | | |
|---|---|---|---|
| 2,388,373 | 11/1945 | Stewart | 260/84.5 |
| 2,562,944 | 8/1951 | Portser, Jr. | 260/82.3 |
| 4,111,867 | 9/1978 | Komuro et al. | 260/5 |
| 5,045,611 | 9/1991 | McNeil | 526/81 |
| 5,166,259 | 11/1992 | Schmeing et al. | 524/814 |
| 5,384,349 | 1/1995 | Trepka et al. | 524/111 |
| 5,385,960 | 1/1995 | Emmons et al. | 523/200 |

*Primary Examiner*—Tae Yoon
*Attorney, Agent, or Firm*—Robert F. Rywalski; Larry R. Meenan

[57] ABSTRACT

A process of forming a seed polymer for use in an emulsion polymerization reaction. The process includes the steps of providing an aqueous mixture of styrene, emulsifying agent, initiator and at least one polymerizable di- or tri-carboxylic acid and then polymerizing the aqueous mixture in the presence of a nonpolymerizable di- or tri-carboxylic acid to form the seed polymer.

26 Claims, No Drawings

PROCESS FOR FORMING A SEED POLYMER

FIELD OF THE INVENTION

The present invention relates to a free radical, emulsion polymerization process of forming a seed polymer. More particularly, the present invention relates to a process of forming either an external seed polymer or an in-situ seed polymer for a polymerization reaction to produce a latex product.

BACKGROUND OF THE INVENTION

Synthesis of polymer emulsions in an aqueous system is conventionally performed by polymerization of monomers with emulsifiers in either a batch polymerization or a seeded polymerization process.

In the batch polymerization process all of the ingredients are charged to a reactor vessel followed by an initiator to make a final latex product.

In the seeded polymerization process, either an external or an in-situ seed is used. The external seed is commonly a very small particle size latex made by the batch polymerization process. This latex is stored and small quantities are then used as needed as a seed to polymerize and grow larger particle size latex products.

The in-situ seed preparation process is the first stage (Stage 1) of a continuous polymerization process where water, emulsifiers, chelates and a small portion of the recipe's monomer, alone or with a comonomer, are polymerized to form the desired number of seed polymer particles. All other conditions being equal, the amount of monomer used for seed determines the number and size of seed particles formed and the particle growth of the final latex product. The seed, once formed, is followed by a second stage (Stage 2) of successive additions of the remaining recipe monomers to form the final latex product. Seed monomers plus additional monomers total 100 parts by weight.

In the emulsion polymerization of in-situ prepared seed polymer, the seed cannot be comparatively freely checked and controlled because the preparation of the seed is an integral part of the process for making the final product. Accordingly, as part of an on-going process, correction of the properties of the seed polymer cannot be made. Therefore, process consistency is critical. External seed polymerization has an advantage over in-situ seed polymerization in that the particle size of the seed polymers can be comparatively freely checked and controlled thus assuring controlled particle growth in the final latex product. However, extra production storage tanks are required and seed storage stability can become critical.

In conventional seeded polymerization processes the reactions are typically carried out in the presence of seed polymer particles having a molecular weight of, e.g., 100,000 or more of weight average molecular weight, while adding polymerizable monomers to the reaction system. During the seeded polymerization process, the essential ingredients are monomer, emulsifying agent, water and a water soluble initiator. Typically, the monomer is dispersed in the aqueous phase by the emulsifying agent. The reaction is then initiated by the water soluble initiator.

Three distinct phases can be identified during Stage 1 of the seeded polymerization process. In Phase 1 of Stage 1 of the formation of, for example, polystyrene seed, styrene is present in large monomer droplets and in monomer swollen emulsifier micelles. A small amount (0.054% at, 153° F. (Fahrenheit)) is dissolved in the water phase. Radicals generated by the initiator diffuse through the water phase and react with the styrene in the water phase and in the micelles to initiate polymerization. Because the total surface of the micelles is very large compared to that of the monomer droplets, initiation occurs almost exclusively in the micelles. Any growing polymer molecules in the water phase rapidly become insoluble and adsorb emulsifier in order to maintain colloidal stability. The large monomer droplets serve as a reservoir of styrene that continually diffuses into the water as styrene from the water is absorbed into the micelles forming the growing polymer particles. When the number and size of growing particles swollen with styrene reaches the point at which all the emulsifier has been adsorbed on these particles, all new particle formation ceases.

In Phase 2 of Stage 1 of the seeded polymerization process, the seed polymerization rate is nearly constant as styrene diffuses from the droplets through the water to the growing polymer particles. This phase continues until all of the monomer droplets are depleted.

During Phase 3 of Stage 1 of the seeded polymerization process, the reaction occurs only in the monomer swollen polymer particles. Near the end of the polymerization, the reaction rate decreases as the styrene concentration decreases.

In the in-situ seed process, during Stage 2, the remaining recipe monomers to form the final latex must be introduced into the reactor while the seed polymer is still active. Stage 2 may be started when the seed polymer has reached 80–90 percent conversion.

It has been an accepted practice to co-polymerize monomeric acids such as acrylic, methacrylic, itaconic and the like with aromatic and aliphatic monomers to introduce carboxyl functionality and strengthen the finished polymer. However, it will be appreciated that this has the disadvantage of either adversely affecting colloidal stability or the conversion level of these monomers either in Stage 1 (i.e., during seed formation) or Stage 2 (i.e., during monomer feed).

It will also be appreciated from the foregoing that there is a significant need for an improved process of preparing seed polymer that overcomes the problems of the prior art. Accordingly, it is an object of the present invention to provide an improved process of preparing seed polymer. Another object of the present invention is to provide a process of preparing seed polymer that eliminates or reduces the induction period thereby reducing initiation and particle size variability. Yet another object of the present invention is to provide a process of preparing a seed polymer having a shortened seed cycle time. Another object of the present invention is to provide a process of preparing a seed polymer with improved colloidal stability and with improved conversion of monomer to seed polymer to improve the final latex product. Still another object of the present invention is to provide a process of preparing a seed polymer wherein the level of more expensive polymerizable monomeric acids is reduced. Another object of the present invention is to provide a method of lowering the residue of the seed polymer and of the final latex product. Another object of the present invention is to provide a method of improving the calcium ion tolerance of the seed polymer and of the polymer latex. Yet another object of the present invention is to provide a process of preparing seed polymer that is simple and economical to practice.

SUMMARY OF THE INVENTION

Briefly, according to this invention there is provided a process of forming a seed polymer for use in an emulsion polymerization reaction. The process includes the steps of providing an aqueous mixture of styrene, emulsifying agent, initiator and at least one polymerizable di- or tri-carboxylic acid and then polymerizing the aqueous mixture in the presence of a nonpolymerizable di- or tri-carboxylic acid to form the seed polymer.

In yet another embodiment of the present invention, additional nonpolymerizable di- or tri-carboxylic acid is added to the final latex product after polymerization is complete.

DETAILED DESCRIPTION OF THE PREFERRED EMBODIMENTS

The present invention relates to a process of forming a seed polymer either as an external seed or as an in-situ seed. The process includes the steps of providing a polymerizable aqueous mixture of monomer, emulsifying agent, initiator and a polymerizable di- or tri-carboxylic acid. In one embodiment, the aqueous mixture is then polymerized in the presence of a nonpolymerizable di- or tri-carboxylic acid under conditions to affect formation of the seed polymer. In yet another embodiment, additional nonpolymerizable di- or tri-carboxylic acid may be added to the final latex product after polymerization is complete.

It will be appreciated that polymerization of seed polymer often may have varying induction periods followed by very rapid initiation and propagation. Consequently, the variation in the number of particles generated between substantially identical polymerization batches results in poor control of the particle size of the final latex product.

Conventional seed polymers have typically been formed by copolymerizing monomeric acids such as acrylic acid, methacrylic acid, itaconic acid and the like with a monomer, e.g., styrene. Addition of the polymerizable monomeric acid eliminates or reduces the activation energy for initiator decomposition and promotes free radical formation and monomer polymerization. However, this eliminates or reduces induction but either affects colloidal stability or the conversion level of monomer to seed polymer. An example of this is the use of itaconic acid which promotes initiation but causes seed die out at lower conversions.

In accordance with one embodiment of the present go invention, a nonpolymerizable di- or tri-carboxylic acid can be used in place of at least part of the more expensive polymerizable acid to establish a concentration of hydrodium ions which favorably affects the decomposition rate of the initiator and the formation of free radicals. As a result, the induction period is reduced or eliminated thereby reducing the time period for initiation and particle size variability between batches.

The use of a nonpolymerizable acid also substantially shortens the seed cycle because of higher conversion levels of monomer to seed polymer; reduces the amount of more expensive polymerizable acids required; and lowers the residue in the seed polymer. Moreover, the seed polymer produced in accordance with the present invention, when incorporated in an emulsion polymerization reaction to form a latex, improves the residue in the final latex product and improves the latex multivalent ion tolerance which is important for applications where the latex is used with fillers such as calcium carbonate. Carpet backing and paper coatings are two such applications.

The seed polymer in accordance with the present invention can be prepared in-situ as Stage 1 of an emulsion polymerization process for preparing the final latex product or the seed polymer can be prepared separate from the process as an external seed polymer. It will be appreciated that with an external seed, properties of the seed can be checked and verified before use thereby insuring good particle size control of the final product.

There are no specific restrictions as to the types of polymerizable monomers used in Stage 1 or Stage 2 of the polymerization process so long as the monomers are radically polymerizable in an aqueous medium. Examples of such monomers include aromatic vinyl compounds, aliphatic conjugated diene compounds, ethylenically unsaturated carboxylates and mixture of two or more polymerizable monomers.

The aromatic vinyl compounds contain from about 8 to about 12 total carbon atoms. Examples of specific aromatic vinyl compounds include α-methyl styrene, p-tertiary butyl styrene, methyl vinyl toluene, p-vinyl toluene, 3-ethyl styrene, and the like, with styrene being preferred. Mixtures of two or more aromatic vinyl aromatic compounds can also be utilized.

The aromatic vinyl compounds are used in an amount of about 30 to about 90 parts by weight, preferably about 45 to about 85 parts by weight, per 100 parts by weight of the total amount of monomers added (pph).

The aliphatic conjugated diene compounds contain from about 4 to about 8 carbon atoms, and desirably from about 4 to about 6 carbon atoms. Examples of specific aliphatic conjugated diene compounds include piperylene, isoprene, 2,3-dimethyl-1,3-butadiene and the like, and preferably, 1,3-butadiene. Mixtures of two or more aliphatic conjugated diene compounds may also be used.

The alipahitic conjugated diene compounds are used in an amount of about 20 to about 98 parts by weight, preferably about 15 to about 55 parts by weight, per 100 parts by weight of the total amount of monomers added (pph).

The ethylenically unsaturated carboxylate compounds contain from about 5 to about 20 carbon atoms, and preferably about 5 to about 11 carbon atoms. Examples of specific ethylenically unsaturated carboxylates include methacrylate, methylmethacrylate, butylacrylate, 2-ethylhexylacrylate, laurylacrylate, hydroxyethylmethacrylate, and the like, and mixtures of two or more ethylenically unsaturated carboxylate compounds may also be used.

The ethylenically unsaturated carboxylate monomers are used in an amount of about 0.5 to about 5 parts by weight, preferably about 0.75 to about 2 parts by weight, per 100 parts by weight of the total amount of monomers added (pph).

The above monomers are polymerized in the presence of water to form the seed polymer of the present invention using conventional emulsion polymerization procedures and techniques except as otherwise provided herein. Free radical initiators, optional chain transfer agents, various emulsifiers, chelating agents and the like can be used as set forth in U.S. Pat. No. 5,166,259 to Schmeing and White, incorporated herein by reference.

The free radical initiators utilized to polymerize the various monomers include sodium persulfate, ammonium persulfate, potassium persulfate and the like. Other free radical initiators can be utilized which decompose or become active at the polymerization temperature such as various peroxides, e.g., cumene hydroperoxide, dibenzoyl peroxide, diacetyl peroxide, dodecanoyl peroxide, di-t-butyl peroxide, dilauroyl peroxide, bis(p-methoxy benzoyl) peroxide, t-butyl peroxy pivalate, dicumyl peroxide, isopropyl percarbonate, di-sec-butyl peroxidicarbonate, various azo initiators such as azobisdimethyivaleronitrile, 2,2'-azobisisobutyronitrile, 2,2'-azobis(2-amidinopropane) dihydrochloride, 2,2'-azobis-2-methylbutyronitrile, 2,2'-azobis(methylisobutyrate), and the like and mixtures thereof.

The amount of the free radical initiator is generally from about 0.025 to about 1, and preferably from about 0.05 to about 0.5 parts by weight per 100 parts by weight of the total amount of monomers added (pph).

The seed emulsion polymerization reaction includes a nonpolymerizable di- or tri-carboxylic acid such as citric acid, glutaric acid, malonic acid, oxalic acid, succinic acid and tartaric acid in combination with polymerizable ethylenically unsaturated carboxylic acid such as acrylic acid, methacrylic acid, fumaric acid, aconitic acid, citraconic acid, crotonic acid, maleic acid, itaconic acid, mestonic acid and the like.

In accordance with one embodiment of the present invention the nonpolymerizable acid is used in place of some of the polymerizable ethylenically unsaturated carboxylic acid to establish a concentration of hydronium ions which affects the decomposition rate of the initiator and the formation of free radicals. As used herein the term "nonpolymerizable acid" refers to an acid which lacks a carbon double bond for polymerization. In contrast, the term "polymerizable acid" refers to an acid which contains at least one carbon double bond. It will be appreciated that the carbon double bond may be opened by the initiator to form polymer chains.

The amount of nonpolymerizable di- or tri-carboxylic acid found acceptable is about 0.05 to about 3, and preferably about 0.075 to about 1 parts by weight per 100 parts by weight of the total amount of monomers added (pph). The amount of polymerizable ethylenically unsaturated carboxylic acid found acceptable is about 0.05 to about 2.5, and preferably about 0.065 to about 2.25 parts by weight per 100 parts by weight of the total amount of monomers added (pph). In a preferred embodiment, the ratio of nonpolymerizable di- or tri-carboxylic acid to polymerizable ethylenically unsaturated carboxylic acid is about 1:1.

Above the level of about 2.5 pph polymerizable ethylenically unsaturated carboxylic acid or 3 pph nonpolymerizable di- or tri-carboxylic acid the decomposition of the initiator may be too rapid. Moreover, above the level of 2.5 pph polymerizable ethylenically unsaturated carboxylic acid, the excessive acid concentration effects the incorporation of the acid into the polymer. Furthermore, below about 0.05 pph polymerizable ethylenically unsaturated carboxylic acid or nonpolymerizable di- or tri-carboxylic acid acid level, the colloidal system is unstable.

Optional chain transfer agents include mercaptans such as the alkyl and/or aryl mercaptans having from about 8 to about 18 carbon atoms and preferably from about 12 to about 14 carbon atoms. The tertiary alkyl mercaptans having from about 12 to about 14 carbon atoms are highly preferred. Examples of specific chain transfer agents include n-octyl mercaptan, n-dodecyl mercaptan, t-octyl mercaptan, t-dodecyl mercaptan, tridecyl mercaptan, tetradecyl mercaptan, hexadecyl mercaptan and the like, as well as mixtures thereof.

The amount of the chain transfer agent utilized is from about 0 to about 1, and preferably from about 0.25 to about 0.75 parts by weight per 100 parts by weight of the total amount of monomers added (pph).

The emulsifiers can generally be any surfactant, soap, or the like which are well known in the art and stable at the pH of the bimodal latex in accordance with the present invention. Examples of specific emulsifiers include alkyl sulfates, alkyl sulfosuccinates, alkyl aryl sulfonates, "-olefin sulfonates, quaternary ammonium salts, amine salts, fatty or resin acid salts, nonyl or octyl phenol reaction products of ethylene oxide and the like. The alkyl portion of the various emulsifiers generally has from about 8 to about 18 carbon atoms. Examples of specific surfactants include sodium lauryl sulfate, sodium sulfosuccinates such as sodium dimethylamyl sulfosuccinate, sodium dodecyl diphenyloxide disulfonate and the like.

The amount of emulsifier present is sufficient to obtain an aqueous emulsion of the monomers. Such an amount is typically from about 0.5 to about 1 parts by weight per 100 parts by weight of the total amount of monomers added (pph). Other surfactants that may be utilized include those identified in Surface Active Agents, Schwartz and Perry, Vol. I, Interscience Publishers, Inc., New York, 1958; Surface Activity, Moilet, Collie and Black, D. Van Nostrand Company, Inc. New York, 1961; Organic Chemistry, Feiser and Feiser, D.C. Heath and Company, Boston, 1944; and The Merck Index, Seventh Edition, Merck & Co., Inc., Rahway, N.J., 1960, all of which are hereby incorporated by reference.

Chelating agents may also be used during polymerization to tie up various metal impurities as well as to achieve a uniform polymerization. Examples of specific chelating agents include ethylene diamine tetra-acetic acid, nitrilotriacetic acid, citric acid, and their ammonium, potassium and sodium salts.

The amounts of the chelating agents may range from about 0.025 to about 0.1 parts by weight per 100 parts by weight of the total amount of monomers added.

In Stage 1, during in-situ preparation of a seed polymer, the polymerization process is affected by the selective addition of the various reactants to the reactor. The process includes the step of forming the polymeric seed by charging into the reactor an aqueous emulsion polymerizable mixture including at least one emulsion polymerizable monomer, surfactant, chelating agent, initiator and nonpolymerizable di- or tri-carboxylic acid and polymerizable ethylenically unsaturated di- or tri-carboxylic acid. The surfactant is added above the critical micelle concentration. The critical micelle concentration is defined as the minimum concentration of surfactant necessary for the formation of micelles, i.e., submicroscopic aggregations of surfactant molecules.

In a preferred embodiment, the surfactant, chelating agent and nonpolymerizable di- or tri-carboxylic acid and polymerizable ethylenically unsaturated di- or tri-carboxylic acid, and monoolefinic monomers, most preferably citric acid and styrene, are first added to the reactor, heated to about 150° F. and then an aqueous mixture of free radical initiator is added. The aqueous reactants are allowed to react and then the temperature is increased to about 170° F.

Subsequently, during Stage 2, aqueous emulsion polymerizable mixtures including at least one polymerizable monomer and about 0.25 to about 0.75 wt % chain transfer agent are added to the reactor.

In a preferred embodiment, the aqueous polymerizable mixtures are charged to the reactor as separate batches at a rate faster than the polymerization rate such that after each charge the mixture is allowed to react within the reactor. For example, during Stage 2, the aqueous emulsion polymerizable mixtures includes styrene, butadiene and chain transfer agent. Subsequent batches include similar aqueous emulsion polymerizable mixtures of styrene, butadiene and chain transfer agent. A total of six to twelve batches are added to total 100 parts monomers. The emulsion polymerizable mixture is then allowed to react in the reactor to constant solids to form the final latex product. It will be appreciated that at constant solids the monomer conversion to copolymer is approximately 95–98%.

Finally, an initiator, defoamer and sodium hydroxide are added to the latex and stripped until the residual monolefinic monomer is about 0.05% or less. After stripping a suitable biocide well known in the art may be added.

Polymerization is generally carried out from about 120° to about 200° F., and preferably from about 150° to about 170° F. Polymerization is generally conducted in an acidic medium when acidic monomers are used and the pH of the latex binder is generally from about 1.0 to about 6.5, preferably from about 1.5 to about 4.0, and most preferably from about 1.5 to about 3.0. The high polymerization temperatures result in high conversion levels of monomer to copolymer.

An important feature of the present invention is that the seed polymer and the latex formed by the polymerization process of the present invention show improved residue levels. Residue is a measure of the oversized non-usable polymer formed during the production and processing of the latex product. The amount of residue remaining is measured and reported as parts per million dry residue on wet weight or volume of latex. The measurement is determined by gravity filtering the latex product through various sized screens; e.g., 325 mesh and determining the weight fraction that does not go through that filter size. Residue levels before stripping operations of the latex in accordance with the present invention are less than about 100 ppm and preferably about 50–100 ppm.

Another important feature of the present invention is that the seed polymer and the latex formed by the polymerization process of the present invention show reduced prefloc. Prefloc is the amount of coagulum and reactor fouling that is removed from the reactor after it is emptied. The prefloc is weighed and calculated as a percentage of the amount of latex polymer yield from the reaction. It will be appreciated that it is desirable to have no coagulum or as little as possible so as not to affect yield or reactor heat transfer.

The invention will be further clarified by a consideration of the following examples, which are intended to be purely exemplary of the invention.

EXAMPLE 1

Four in-situ seed polymers were prepared from an emulsion polymerizable mixture of 3.5 parts styrene, 75.303 parts water, 0.050 parts trisodium salt of ethylene diamine tetraacetic acid (EDTA), 0.865 parts sodium dihexyl sulfosuccinate and 0.2 parts ammonium persulfate with the following emulsion polymerization ingredients identified in Table 1 to determine the effect of the addition of citric acid, a nonpolymerizable dicarboxylic acid, and itaconic acid, a polymerizable dicarboxylic acid, on initiation, percent conversion and seed residue. The polymerization reaction was conducted for about 60 minutes at 149° F. and then cooled to 80–90° F.

TABLE 1

|  | Seed Polymer 1 | Seed Polymer 2 | Seed Polymer 3 | Seed Polymer 4 |
| --- | --- | --- | --- | --- |
| ammonium hydroxide | — | 0.055 | — | 0.055 |
| citric acid | — | 0.300 | — | 0.300 |
| itaconic acid | — | — | 1.125 | 1.125 |

| MINUTES | % CONVERSION | | | |
| --- | --- | --- | --- | --- |
| 0 | 0.0 | 0.0 | 0.0 | 0.0 |
| 1 | 0.0 | 4.6 | 2.1 | 4.0 |
| 3 | 3.1 | 10.0 | 4.4 | 10.6 |
| 5 | 7.5 | 16.7 | 7.8 | 17.1 |
| 10 | 35.9 | 49.9 | 34.9 | 44.1 |
| 15 | 53.1 | 68.8 | 51.9 | 61.7 |
| 20 | 78.3 | 82.6 | 65.4 | 79.1 |

As shown in Table 1, Seed Polymer 1 versus Seed Polymer 3, the presence of polymerizable itaconic acid eliminated the induction period and tended to reduce the conversion at 20 minutes. Although the seed cycle of Seed Polymer 1 reached 78% in 20 minutes, possibly because of a burst of new particles, Seed Polymer 1 generated undesirable residue. Seed Polymer 3 required at least 30 minutes before Stage 2 monomer additions could be started. Comparing Seed Polymer 2, Seed Polymer 3 and Seed Polymer 4, the presence of the nonpolymerizable acid improved initiation and resulted in conversion levels close to 80% where it is desirable to start the Stage 2 monomer additions. Accordingly, the seed cycle time was reduced.

EXAMPLE 2

Two samples of each of the Seed Polymers 1–4 of Example 1 were then measured for residue using a 325 mesh screen and reported as parts per million (ppm) on a solids basis as previously described. The residue of the Seed Polymers 1–4 are provided in Table 2. The Seed Polymer 2 and Seed Polymer 4 containing citric acid showed lower residue.

TABLE 2

| | 32 Mesh Seed Residue (ppm) | | | |
| --- | --- | --- | --- | --- |
| sample | Seed Polymer 1 | Seed Polymer 2 | Seed Polymer 3 | Seed Polymer 4 |
| 1 | 20 | 0 | 83 | 16 |
| 2 | 20 | 0 | 66 | 16 |
| avg. | 20 | 0 | 75 | 16 |

EXAMPLE 3

Three full cycle latex batches (Product 1–3) were prepared from an emulsion in which in-situ seed polymer (Seed Polymer 1–3) was made using a polymerizable mixture of 7.5 parts styrene, 54.7 parts water, 0.025 parts tri-sodium EDTA, 1.0 part sodium diisobutyl sulfosuccinate and 0.4 parts ammonium persulfate with the following ingredients identified in Table 3. A sample of the in-situ seed polymer (Stage 1) was removed from the reactor prior to Stage 2 and 325 mesh residue was determined and reported in Table 4.

TABLE 3

| STAGE 1 | Seed Polymer 1 | Seed Polymer 2 | Seed Polymer 3 |
| --- | --- | --- | --- |
| ammonium hydroxide | 0.055 | 0.055 | 0.055 |
| citric acid | 0.300 | 0.300 | 0.300 |
| itaconic acid | 0.65 | 0.65 | 0.65 |
| Sodium Dodecyl Diphenyloxide Disulfonate | 0.152 | 0.147 | 0.142 |

| STAGE 2 | Product 1 | Product 2 | Product 3 |
| --- | --- | --- | --- |
| Styrene | 54.95 | 54.95 | 54.95 |
| t-dodecyl Mercaptan | 0.50 | 0.50 | 0.50 |
| Methacrylic acid | 1.00 | 1.00 | 1.00 |
| Butadiene | 35.90 | 35.90 | 35.90 |

TABLE 4

| STAGE 1 | Seed Polymer 1 | Seed Polymer 2 | Seed Polymer 3 |
| --- | --- | --- | --- |
| seed residue 325 mesh | 6 | 15 | 24 |

| STAGE 2 | Product 1 | Product 2 | Product 3 |
| --- | --- | --- | --- |
| product residue 200 mesh | 120 | 198 | 280 |
| product residue 325 mesh | 24 | 58 | 72 |
| total final product residue | 144 | 256 | 352 |

Table 4 demonstrates the effect of seed residue on final latex product residue. The amount of residue in the final latex product is proportional to that in the seed polymer. As shown in Table 4, it is desirable to have as low a seed polymer residue as possible to provide a low final latex product residue.

EXAMPLE 4

A latex formulation of Example 3 having 7.5 parts styrene monomer per hundred parts polymer were tested for calcium ion stability. It will be appreciated that some lattices interact with ions resulting in undesirable aggregation of the individual particles. The multivalent calcium ion (Ca++) ion found in hard water is the most common source of problems in the field of paper coatings. To evaluate the sensitivity of a latex to multivalent ion stability problems, a solution of calcium chloride was added to the latex samples and then filtered to determine the aggregation level that developed.

The formulations of the seed polymer and stability of the lattices are reported in Table 5.

TABLE 5

|  | Product 1 | Product 2 | Product 3 | Product 4 |
| --- | --- | --- | --- | --- |
| Sodium Dihexyl Sulfosuccinate | 0.760 | 0.810 | 0.760 | 0.710 |
| ammonia | 0.0 | 0.0 | 0.0137 | 0.0137 |
| citric acid | 0.0 | 0.0 | 0.075 | 0.075 |
| itaconic acid | 2.25 | 2.25 | 1.13 | 1.13 |
| Ca++ ion stability | 0.0088 | 0.0084 | 0.0004 | 0.0012 |
| *Particle size Gaussian (A) | 1953 | 1890 | 1852 | 1997 |

*Spec Range = 1800–2100 C.

As shown in Table 5, the lattices exhibited improved calcium ion tolerance when citric acid was used in the polymerization process.

EXAMPLE 5

An ammoniated 30.2% by weight citric acid solution was added to each latex (Product 1–3) of Example 3 after completion of the polymerization process to determine the effect of citric acid post addition on calcium stability. The lattices were permitted to maturate over 8 hours before testing with a 5% calcium chloride solution. The results of the post addition of citric acid to the lattices are reported in Table 6.

TABLE 6

|  | Control Latex | Latex 1 | Latex 2 |
| --- | --- | --- | --- |
| ammonia | 0.0 | 0.0398 | 0.0796 |
| citric acid (30.2 wt % citric acid solution and ammonium hydroxide) | 0.0 | 0.2170 | 0.4340 |
| Ca++ ion stability | 0.3696 | 0.0044 | 0.0036 |

As shown in Table 6, the lattices having a post addition of citric acid also exhibited improved calcium ion stability.

EXAMPLE 6

Lattices were prepared containing 0.025 pph Hampene, 1.0 pph Monawet MB45, 0.152 pph Dowfax 2A1, 1.0 pph Methacrylic acid, 7.5 pph styrene, 0.40 pph ammonium persulfate and the amount of ammonia, citric acid and itaconic acid were varied as shown in Table 7 to determine the effect of citric acid addition on residue. The results are reported in Table 7.

TABLE 7

| PRODUCT | 1 | 2 | 3 | 4 | 5 | 6 | 7 |
|---|---|---|---|---|---|---|---|
| VARIABLES: | | | | | | | |
| Ammonia | 0.0547 | 0.0274 | 0.0274 | 0 | 0 | 0 | 0 |
| Citric Acid | 0.30 | 0.15 | 0.15 | 0 | 0 | 0 | 0 |
| Itaconic acid | 0.65 | 0.65 | 0 | 2.25 | 1.25 | 1.00 | 0.75 |
| RESULTS: | | | | | | | |
| Reactor | | | | | | | |
| % Prefloc fouling | 0.03 light on side and agitator | 0.08 light on side and agitator | 0.51 medium | 0.13 medium on upper wall light on lower | 0.10 medium to heavy | 0.14 heavy on wall and agitator | 0.43 sample line plugged |
| Blow/Over Latex | | | | | | | |
| % residual styrene | 0.239 | 0.374 | 0.249 | 0.894 | 1.352 | 0.790 | 0.967 |
| total residue | 187 | 218 | 57 | 236 | 234 | 270 | 141 |

As shown in Table 7, it is seen in lattices 1 and 2 versus lattices 3–7 that there is a synergism of citric acid and itaconic acid which produces lower prefloc and reactor fouling than either of them alone. It is also evident that the use of citric acid, a dicarboxylic nonpolymerixable acid, in lattices 1 and 3 results in lower unreacted residual styrene indicating higher conversion before blowover to the stripper. It will be appreciated that during commercial production this results in a shorter stripper time and an economical advantage. Lattices 1, 2 and 3 containing citric acid are cleaner lattices having a lower residue which in a paper coating application is highly desirable.

The documents, patents and patent applications referred to herein are hereby incorporated by reference.

Having described presently preferred embodiments of the present invention, it is to be understood that it may be otherwise embodied within the scope of the appended claims.

What is claimed is:

1. A process of forming a stable seed polymer for use in an emulsion polymerization reaction, the process comprising the steps of:
   providing a polymerizable aqueous mixture comprising a monomer selected from the group consisting of α-methyl styrene, p-tertiary butyl styrene, methyl vinyl toluene, p-vinyl toluene, 3-ethyl styrene, piperylene, isoprene, 2,3-dimethyl-1,3-butadiene, methacrylate, methylmethacrylate, butylacrylate, 2-ethylhexylacrylate, laurylacrylate, hydroxyethylmethacrylate, and mixtures thereof, emulsifying agent, initiator, about 0.05 to about 2.5 pph of at least one polymerizable ethylenically unsaturated carboxylic acid;
   polymerizing the aqueous mixture in the presence of about 0.05 to about 3 pph of at least one nonpolymerizable di- or tri-carboxylic acid to establish a concentration of hydronium ions and form the seed polymer.

2. The process of claim 1 wherein the nonpolymerizable di- or tri-carboxylic acid is selected from the group consisting of citric acid, glutaric acid, malonic acid, oxalic acid, succinic acid and tartaric acid.

3. The process of claim 2 wherein the polymerizable ethylenically unsaturated carboxylic acid is selected from the group consisting of acrylic acid, methacrylic acid, fumaric acid, aconitic acid, citraconic acid, crotonic acid, maleic acid, itaconic acid, and mestonic acid.

4. The process of claim 1 wherein the α-methyl styrene, p-tertiary butyl styrene, methyl vinyl toluene, p-vinyl toluene, 3-ethyl styrene, and mixtures thereof are used in an amount of about 30 to about 90 parts by weight per 100 parts by weight of the total amount of monomers added.

5. The process of claim 1 wherein the piperylene, isoprene, 2,3-dimethyl-1,3-butadiene and 1,3-butadiene and mixtures thereof are used in an amount of about 20 to about 98 parts by weight per 100 parts by weight of the total amount of monomers added.

6. The process of claim 1 wherein the methacrylate, methylmethacrylate, butylacrylate, 2-ethylhexylacrylate, laurylacrylate, hydroxyethylmethacrylate, and mixtures thereof are used in an amount of about 0.5 to about 5 parts by weight per 100 parts by weight of the total amount of monomers added.

7. The process of claim 1 wherein the ratio of nonpolymerizable di- or tri-carboxylic acid to polymerizable ethylenically unsaturated carboxylic acid is about 1:1.

8. A process of forming a seed polymer for use in an emulsion polymerization reaction, the process comprising the steps of:
   providing a polymerizable aqueous mixture of at least one monomer, emulsifying agent, initiator, at least one polymerizable ethylenically unsaturated carboxylic acid;
   polymerizing the aqueous mixture in the presence of at least one nonpolymerizable di- or tri-carboxylic acid to form the seed polymer; and then
   adding nonpolymerizable di- or tri-carboxylic acid to the seed polymer.

9. A process of forming a seed polymer for use in an emulsion polymerization reaction, the process comprising the steps of:
   providing a polymerizable aqueous mixture of at least one monomer selected from the group consisting of α-methyl styrene, n-tertiary butyl styrene, methyl vinyl toluene, p-vinyl toluene, 3-ethyl styrene, piperylene, isoprene, 2,3-dimethyl-1,3-butadiene, methacrylate, methylmethacrylate, butylacrylate, 2-ethylhexylacrylate, laurylacrylate, hydroxyethylmethacrylate, and mixtures thereof, emulsifying agent, initiator, at least one polymerizable ethylenically unsaturated carboxylic acid;

polymerizing the aqueous mixture in the presence of at least one nonpolymerizable di- or tri-carboxylic acid to form the seed polymer; and then adding to the seed polymer aqueous emulsion polymerizable mixtures including styrene, butadiene and a chain transfer agent at a rate faster than the polymerization rate such that after each batch addition, the mixture is allowed to react to constant solids to form a final latex product; and adding nonnolymerizable di- or tri-carboxylic acid to the final latex product.

10. A process of forming a seed polymer for use in an emulsion polymerization reaction, the process comprising the steps of:

providing a polymerizable aqueous mixture consisting of a styrene monomer, emulsifying agent, initiator, about 0.05 to about 2.5 parts by weight per 100 parts by weight of the total amount of monomers added of at least one polymerizable ethylenically unsaturated carboxylic acid; and then polymerizing the aqueous mixture in the presence of about 0.05 to about 3 parts by weight per 100 parts by weight of the total amount of monomers added of at least one nonpolymerizable di- or tri-carboxylic acid selected from the group consisting of citric acid, glutaric acid, malonic acid, oxalic acid, succinic acid and tartaric acid to form the seed polymer.

11. A process of forming a seed polymer for use in an emulsion polymerization reaction, the process comprising the steps of:

providing a polymerizable aqueous mixture of a styrene monomer, emulsifying agent, initiator, about 0.05 to about 2.5 parts by weight per 100 parts by weight of the total amount of monomers added of at least one polymerizable ethylenically unsaturated carboxylic acid;

polymerizing the aqueous mixture in the presence of about 0.05 to about 3 parts by weight per 100 parts by weight of the total amount of monomers added of at least one nonpolymerizable di- or tri-carboxylic acid selected from the group consisting of citric acid, glutaric acid, malonic acid, oxalic acid, succinic acid and tartaric acid to form the seed polymer;

adding to the seed polymer aqueous emulsion polymerizable mixtures of styrene, butadiene and a chain transfer agent as separate batches at a rate faster than the polymerization rate such that after each batch addition, the mixture is allowed to react to constant solids to form a final latex product; and then adding nonpolymerizable di- or tricarboxylic acid to the final latex product.

12. The process of claim 8 wherein the nonpolymerizable di- or tri-carboxylic acid is about 0.05 to about 3 parts by weight per 100 parts by weight of the total amount of monomers added and the polymerizable ethylenically unsaturated carboxylic acid is about 0.05 to about 2.5 parts by weight per 100 parts by weight of the total amount of monomers added.

13. The process of claim 8 wherein the nonpolymerizable di- or tri-carboxylic acid is selected from the group consisting of citric acid, glutaric acid, malonic acid, oxalic acid, succinic acid and tartaric acid.

14. The process of claim 8 wherein the polymerizable ethylenically unsaturated carboxylic acid is selected from the group consisting of acrylic acid, methacrylic acid, fumaric acid, aconitic acid, citraconic acid, crotonic acid, maleic acid, itaconic acid, and mestonic acid.

15. The process of claim 8 wherein the at least one monomer is selected from the group consisting of aromatic vinyl compounds, aliphatic conjugated diene compounds, ethylenically unsaturated carboxylates and mixture thereof.

16. The process of claim 8 wherein the at least one monomer is selected from the group consisting of α-methyl styrene, p-tertiary butyl styrene, methyl vinyl toluene, p-vinyl toluene, 3-ethyl styrene, piperylene, isoprene, 2,3-dimethyl-1,3-butadiene, methacrylate, methylmethacrylate, butylacrylate, 2-ethylhexylacrylate, laurylacrylate, hydroxyethylmethacrylate, and mixtures thereof.

17. The process of claim 15 wherein the ethylenically unsaturated carboxylates are used in an amount of about 0.5 to about 5 parts by weight per 100 parts by weight of the total amount of monomers added.

18. The process of claim 15 wherein the aromatic vinyl compounds are used in an amount of about 30 to about 90 parts by weight per 100 parts by weight of the total amount of monomers added.

19. The process of claim 15 wherein the aliphatic conjugated diene compounds are selected from the group consisting of piperylene, isoprene, 2,3-dimethyl-1,3, butadiene and 1,3-butadiene, and mixtures thereof.

20. The process of claim 15 wherein the alipahitic conjugated diene compounds are used in an amount of about 20 to about 98 parts by weight per 100 parts by weight of the total amount of monomers added.

21. The process of claim 15 wherein the ethylenically unsaturated carboxylate compounds are selected from the group consisting of methacrylate, methylmethacrylate, butylacrylate, 2-ethylhexylacrylate, laurylacrylate, hydroxyethylmethacrylate, and mixtures thereof.

22. The process of claim 15 wherein the ethylenically unsaturated carboxylate monomers are used in an amount of about 0.5 to about 5 parts by weight per 100 parts by weight of the total amount of monomers added.

23. The process of claim 15 wherein the ratio of nonpolymerizable di- or tri-carboxylic acid to polymerizable ethylenically unsaturated carboxylic acid is about 1:1.

24. The process of claim 8 further comprising the steps of adding to the seed polymer aqueous emulsion polymerizable mixtures including at least one polymerizable monomer and a chain transfer agent.

25. The process of claim 24 wherein the aqueous polymerizable mixtures are added as separate batches at a rate faster than the polymerization rate such that after each batch addition, the mixture is allowed to react to constant solids to form a final latex product.

26. The process of claim 25 wherein the aqueous polymerizable mixtures includes styrene, butadiene and chain transfer agent.

* * * * *

UNITED STATES PATENT AND TRADEMARK OFFICE
CERTIFICATE OF CORRECTION

PATENT NO : 6,127,455
DATED : October 3, 2000
INVENTOR(S) : Michael J. Dohar, et al.

It is certified that error appears in the above-identified patent and that said Letters Patent are hereby corrected as shown below:

On title page, item 75 inventor name
replace "Michael J. Dohard"
with --Michael J. Dohar--.

Signed and Sealed this

Twenty-second Day of May, 2001

*Attest:*

NICHOLAS P. GODICI

*Attesting Officer*      *Acting Director of the United States Patent and Trademark Office*